(12) United States Patent
Usukura

(10) Patent No.: US 8,300,188 B2
(45) Date of Patent: Oct. 30, 2012

(54) LIQUID CRYSTAL DISPLAY PANEL WITH MICRO-LENS ARRAY AND LIQUID CRYSTAL DISPLAY DEVICE

(75) Inventor: Naru Usukura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 669 days.

(21) Appl. No.: 12/522,448

(22) PCT Filed: Oct. 26, 2007

(86) PCT No.: PCT/JP2007/070907
§ 371 (c)(1),
(2), (4) Date: Jul. 8, 2009

(87) PCT Pub. No.: WO2008/084589

PCT Pub. Date: Jul. 17, 2008

(65) Prior Publication Data

US 2010/0039583 A1    Feb. 18, 2010

(30) Foreign Application Priority Data

Jan. 11, 2007   (JP) ................................. 2007-003412

(51) Int. Cl.
*G02F 1/1335*   (2006.01)
(52) U.S. Cl. ............... 349/119; 349/95; 349/96; 349/65
(58) Field of Classification Search ............ 349/95, 349/96, 117, 118, 119, 57, 130, 65; 362/97.2
See application file for complete search history.

(56) References Cited

U.S. PATENT DOCUMENTS

| | | |
|---|---|---|
| 4,345,249 A | 8/1982 | Togashi |
| 4,368,523 A | 1/1983 | Kawate |
| 4,889,412 A | 12/1989 | Clerc et al. |
| 4,955,698 A | 9/1990 | Knoll et al. |
| 5,132,819 A | 7/1992 | Noriyama et al. |
| 5,164,851 A | 11/1992 | Kanemori et al. |
| 5,179,456 A | 1/1993 | Aizawa et al. |
| 5,182,664 A | 1/1993 | Clerc |
| 5,245,450 A | 9/1993 | Ukai et al. |
| 5,260,818 A | 11/1993 | Wu |

(Continued)

FOREIGN PATENT DOCUMENTS

CN   1544985 A   11/2004

(Continued)

OTHER PUBLICATIONS

International Search Report for PCT/JP2007/073231, mailed Feb. 12, 2008.

(Continued)

*Primary Examiner* — Thoi Duong
(74) *Attorney, Agent, or Firm* — Nixon & Vanderhye P.C.

(57) ABSTRACT

A liquid crystal display panel includes a liquid crystal panel having a plurality of pixels; a microlens array provided on a light-incident side of the liquid crystal panel; a first polarizing plate and a first optical compensation element provided on a light-outgoing side of the liquid crystal panel; and a second polarizing plate and a second optical compensation element provided on a light-incident side of the microlens array. The retardation of the first optical compensation element along the thickness direction is greater than the retardation of the second optical compensation element along the thickness direction.

6 Claims, 5 Drawing Sheets

U.S. PATENT DOCUMENTS

| | | | |
|---|---|---|---|
| 5,289,174 | A | 2/1994 | Suzuki |
| 5,309,264 | A | 5/1994 | Lien et al. |
| 5,331,447 | A | 7/1994 | Someya et al. |
| 5,363,294 | A | 11/1994 | Yamamoto et al. |
| 5,408,345 | A | 4/1995 | Mitsui et al. |
| 5,434,687 | A | 7/1995 | Kawata et al. |
| 5,477,358 | A | 12/1995 | Rosenblatt et al. |
| 5,512,336 | A | 4/1996 | Yamahara |
| 5,558,927 | A | 9/1996 | Aruga et al. |
| 5,594,570 | A | 1/1997 | Hirata et al. |
| 5,602,662 | A | 2/1997 | Rosenblatt et al. |
| 5,608,556 | A | 3/1997 | Koma |
| 5,636,043 | A | 6/1997 | Uemura et al. |
| 5,646,702 | A | 7/1997 | Akinwande et al. |
| 5,666,179 | A | 9/1997 | Koma |
| 5,668,651 | A | 9/1997 | Yamada et al. |
| 5,673,092 | A | 9/1997 | Horie et al. |
| 5,699,137 | A | 12/1997 | Kishimoto |
| 5,726,728 | A | 3/1998 | Kondo et al. |
| 5,748,276 | A | 5/1998 | Uno et al. |
| 5,753,093 | A | 5/1998 | Raguse et al. |
| 5,995,176 | A | 11/1999 | Sibahara |
| 6,031,591 | A | 2/2000 | Hamanaka |
| 6,061,117 | A | 5/2000 | Horie et al. |
| 6,069,740 | A | 5/2000 | Hamanaka |
| 6,097,464 | A | 8/2000 | Liu |
| 6,129,439 | A | 10/2000 | Hou et al. |
| 6,141,077 | A | 10/2000 | Hirata et al. |
| 6,169,593 | B1 | 1/2001 | Kanaya et al. |
| 6,175,398 | B1 | 1/2001 | Yamada et al. |
| 6,195,140 | B1 | 2/2001 | Kubo et al. |
| 6,201,592 | B1 | 3/2001 | Terashita et al. |
| 6,222,599 | B1 | 4/2001 | Yoshida et al. |
| 6,256,082 | B1 | 7/2001 | Suzuki et al. |
| 6,266,122 | B1 | 7/2001 | Kishimoto et al. |
| 6,287,649 | B1 | 9/2001 | Fukushima et al. |
| 6,330,047 | B1 | 12/2001 | Kubo et al. |
| 6,335,780 | B1 | 1/2002 | Kurihara et al. |
| 6,339,462 | B1 | 1/2002 | Kishimoto et al. |
| 6,340,998 | B1 | 1/2002 | Kim et al. |
| 6,341,002 | B1 | 1/2002 | Shimizu et al. |
| 6,342,938 | B1 | 1/2002 | Song et al. |
| 6,384,887 | B1 | 5/2002 | Yasuda et al. |
| 6,384,889 | B1 | 5/2002 | Miyachi et al. |
| 6,504,592 | B1 | 1/2003 | Takatori et al. |
| 6,512,564 | B1 | 1/2003 | Yoshida et al. |
| 6,542,212 | B2 | 4/2003 | Yoshida et al. |
| 6,567,144 | B1 | 5/2003 | Kim et al. |
| 6,573,964 | B1 | 6/2003 | Takizawa et al. |
| 6,573,965 | B1 | 6/2003 | Liu et al. |
| 6,577,366 | B1 | 6/2003 | Kim et al. |
| 6,593,982 | B2 | 7/2003 | Yoon et al. |
| 6,600,539 | B2 | 7/2003 | Song |
| 6,614,497 | B2 | 9/2003 | Yamada |
| 6,630,975 | B1 | 10/2003 | Terashita |
| 6,633,351 | B2 | 10/2003 | Hira et al. |
| 6,657,695 | B1 | 12/2003 | Song et al. |
| 6,661,488 | B1 | 12/2003 | Takeda et al. |
| 6,710,825 | B2 | 3/2004 | Kubo et al. |
| 6,717,642 | B2 | 4/2004 | Sasaki et al. |
| 6,784,961 | B2 | 8/2004 | Suzuki et al. |
| 6,788,375 | B2 | 9/2004 | Ogishima et al. |
| 6,812,986 | B2 | 11/2004 | Suzuki et al. |
| 6,822,723 | B2 | 11/2004 | Song et al. |
| 6,829,026 | B2 | 12/2004 | Sasaki et al. |
| 6,839,108 | B1 | 1/2005 | Hirakata et al. |
| 6,862,062 | B2 | 3/2005 | Kubo et al. |
| 6,894,840 | B2 | 5/2005 | Yamanaka et al. |
| 6,924,856 | B2 | 8/2005 | Okumura et al. |
| 6,924,876 | B2 | 8/2005 | Kubo et al. |
| 6,950,160 | B2 | 9/2005 | Kubo et al. |
| 6,965,422 | B2 | 11/2005 | Kubo et al. |
| 6,967,702 | B2 | 11/2005 | Ishii et al. |
| 6,989,874 | B2 | 1/2006 | Chae |
| 6,995,826 | B2 | 2/2006 | Kubo et al. |
| 7,084,943 | B2 | 8/2006 | Kubo et al. |
| 7,139,055 | B2 | 11/2006 | Ogishima et al. |
| 7,145,624 | B2 | 12/2006 | Kubo et al. |
| 7,202,923 | B2 | 4/2007 | Yamabuchi et al. |
| 7,215,395 | B2 | 5/2007 | Kubo et al. |
| 7,230,664 | B2 | 6/2007 | Kubo et al. |
| 7,253,872 | B2 | 8/2007 | Kume et al. |
| 7,277,146 | B2 | 10/2007 | Maeda |
| 7,292,300 | B2 | 11/2007 | Kubo et al. |
| 7,295,262 | B2 | 11/2007 | Mi et al. |
| 7,375,781 | B2 | 5/2008 | Kubo |
| 7,379,137 | B2 | 5/2008 | Kubo |
| 7,391,489 | B2 | 6/2008 | Kume et al. |
| 7,443,473 | B2 * | 10/2008 | Nagai ............................ 349/117 |
| 7,499,136 | B2 | 3/2009 | Kubo |
| 7,505,102 | B2 | 3/2009 | Kubo et al. |
| 7,532,291 | B2 | 5/2009 | Kubo et al. |
| 7,575,854 | B2 | 8/2009 | Suzuki et al. |
| 7,583,332 | B2 | 9/2009 | Lee |
| 2001/0024257 | A1 | 9/2001 | Kubo et al. |
| 2001/0033353 | A1 | 10/2001 | Shimoshikiryo |
| 2002/0036740 | A1 | 3/2002 | Kubo et al. |
| 2002/0036744 | A1 | 3/2002 | Kubo et al. |
| 2002/0054269 | A1 | 5/2002 | Maeda et al. |
| 2002/0060764 | A1 | 5/2002 | Taniguchi et al. |
| 2002/0063834 | A1 | 5/2002 | Sawasaki et al. |
| 2002/0075436 | A1 | 6/2002 | Kubo et al. |
| 2002/0080320 | A1 | 6/2002 | Suzuki et al. |
| 2002/0149728 | A1 | 10/2002 | Ogishima et al. |
| 2002/0159012 | A1 | 10/2002 | Yamada |
| 2002/0171792 | A1 | 11/2002 | Kubota et al. |
| 2002/0191128 | A1 | 12/2002 | Okumura et al. |
| 2003/0001998 | A1 | 1/2003 | Kun |
| 2003/0107695 | A1 | 6/2003 | Kubo et al. |
| 2003/0112213 | A1 | 6/2003 | Noguchi et al. |
| 2003/0169391 | A1 * | 9/2003 | Uchida et al. .................. 349/130 |
| 2003/0202144 | A1 | 10/2003 | Kim et al. |
| 2003/0227429 | A1 | 12/2003 | Shimoshikiryo |
| 2003/0231267 | A1 | 12/2003 | Murai et al. |
| 2004/0041770 | A1 | 3/2004 | Kubo et al. |
| 2004/0061946 | A1 | 4/2004 | Yoshikawa et al. |
| 2004/0070714 | A1 | 4/2004 | Ishii et al. |
| 2004/0135949 | A1 | 7/2004 | Maeda |
| 2004/0201810 | A1 | 10/2004 | Kubo et al. |
| 2004/0225312 | A1 | 11/2004 | Orloff et al. |
| 2004/0233360 | A1 | 11/2004 | Yoshida et al. |
| 2005/0001947 | A1 | 1/2005 | Ogishima et al. |
| 2005/0030458 | A1 | 2/2005 | Sasabayashi et al. |
| 2005/0041186 | A1 | 2/2005 | Shimoshikiryo |
| 2005/0056127 | A1 | 3/2005 | Yamabuchi et al. |
| 2005/0078251 | A1 | 4/2005 | Chen et al. |
| 2005/0140876 | A1 | 6/2005 | Kubo |
| 2005/0168674 | A1 | 8/2005 | Kubo |
| 2005/0213008 | A1 | 9/2005 | Kubo et al. |
| 2005/0237463 | A1 | 10/2005 | Kubo |
| 2005/0270462 | A1 | 12/2005 | Koma |
| 2005/0280754 | A1 | 12/2005 | Kume et al. |
| 2006/0061708 | A1 | 3/2006 | Umebayashi et al. |
| 2006/0114405 | A1 | 6/2006 | Yamaguchi et al. |
| 2006/0119776 | A1 | 6/2006 | Kubo et al. |
| 2006/0139541 | A1 | 6/2006 | Yamaguchi et al. |
| 2006/0139758 | A1 | 6/2006 | Segawa et al. |
| 2006/0158574 | A1 | 7/2006 | Kubo et al. |
| 2006/0278874 | A1 | 12/2006 | Kubo et al. |
| 2006/0291065 | A1 | 12/2006 | Hasei et al. |
| 2007/0019132 | A1 | 1/2007 | Kim et al. |
| 2007/0097293 | A1 | 5/2007 | Nakanishi et al. |
| 2007/0109766 | A1 | 5/2007 | Kodama et al. |
| 2007/0139594 | A1 | 6/2007 | Kubo et al. |
| 2007/0199504 | A1 | 8/2007 | Nakamura et al. |
| 2007/0216827 | A1 | 9/2007 | Okada et al. |
| 2008/0259634 | A1 | 10/2008 | Mi et al. |
| 2008/0266499 | A1 | 10/2008 | Kubo |
| 2009/0284683 | A1 | 11/2009 | Usukura et al. |
| 2010/0007815 | A1 | 1/2010 | Kosegawa et al. |
| 2010/0020263 | A1 | 1/2010 | Murao et al. |
| 2010/0060813 | A1 | 3/2010 | Kawashima et al. |
| 2010/0110352 | A1 | 5/2010 | Saitoh et al. |
| 2010/0118227 | A1 | 5/2010 | Shibata et al. |
| 2010/0157213 | A1 | 6/2010 | Kubo |
| 2010/0182534 | A1 | 7/2010 | Usukura et al. |

FOREIGN PATENT DOCUMENTS

| | | |
|---|---|---|
| EP | 0 645 661 A1 | 3/1995 |
| EP | 0 884 626 A2 | 12/1998 |
| EP | 1 701 202 A1 | 9/2006 |
| JP | 63-21907 B2 | 5/1988 |
| JP | 63-296004 | 12/1988 |
| JP | 1-129234 | 5/1989 |
| JP | 02-149802 | 6/1990 |
| JP | 03-209440 | 9/1991 |
| JP | 04-139402 | 5/1992 |
| JP | 04-293018 | 10/1992 |
| JP | 04-318816 | 11/1992 |
| JP | 05-188364 | 7/1993 |
| JP | 05-289108 | 11/1993 |
| JP | 5-333328 | 12/1993 |
| JP | 06-034966 | 2/1994 |
| JP | 06-043461 | 2/1994 |
| JP | 6-75238 A | 3/1994 |
| JP | 06-118909 | 4/1994 |
| JP | 6-301036 | 10/1994 |
| JP | 6-331831 | 12/1994 |
| JP | 07-027913 | 1/1995 |
| JP | 07-036058 | 2/1995 |
| JP | 07-234400 | 9/1995 |
| JP | 7-281176 A | 10/1995 |
| JP | 07-311383 | 11/1995 |
| JP | 08-148254 | 6/1996 |
| JP | 08-292423 | 11/1996 |
| JP | 09-258266 | 10/1997 |
| JP | 09-269509 | 10/1997 |
| JP | 10-186330 A | 7/1998 |
| JP | 10-301114 A | 11/1998 |
| JP | 11-095197 | 4/1999 |
| JP | 11-109417 A | 4/1999 |
| JP | 11-242225 A | 9/1999 |
| JP | 11-295697 | 10/1999 |
| JP | 2000-47217 | 2/2000 |
| JP | 2000-47253 | 2/2000 |
| JP | 2000-075296 | 3/2000 |
| JP | 2000-249807 | 9/2000 |
| JP | 2000-305110 | 11/2000 |
| JP | 2000-329906 | 11/2000 |
| JP | 2001-021862 A | 1/2001 |
| JP | 2001-343647 A | 12/2001 |
| JP | 2002-055343 A | 2/2002 |
| JP | 2002-236283 | 8/2002 |
| JP | 2003-035824 | 2/2003 |
| JP | 2003-043514 | 2/2003 |
| JP | 2003-43525 A | 2/2003 |
| JP | 2003-270636 | 9/2003 |
| JP | 2003-280548 | 10/2003 |
| JP | 2003-315803 | 11/2003 |
| JP | 2003-337207 | 11/2003 |
| JP | 2004-302195 | 10/2004 |
| JP | 2004-325503 | 11/2004 |
| JP | 2005-128082 | 5/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184334 | 7/2006 |
| JP | 2006-184673 | 7/2006 |
| JP | 2006-220711 | 8/2006 |
| JP | 2006-293410 | 10/2006 |
| JP | 2007-133037 | 5/2007 |
| JP | 2007-329099 | 12/2007 |
| JP | 2008-242307 A | 10/2008 |
| KR | 2003-058012 A | 7/2003 |
| KR | 2003-058140 A | 7/2003 |
| WO | 00/22677 | 4/2000 |

OTHER PUBLICATIONS

U.S. Office Action mailed Feb. 2, 2011 in U.S. Appl. No. 12/440,791.
International Preliminary Report on Patentability mailed Apr. 9, 2009 in PCT Application No. PCT/JP2007/064447.
International Search Report for PCT/JP2006/315142 mailed Aug. 22, 2006.
U.S. Office Action mailed Jun. 23, 2010 in U.S. Appl. No. 11/997,563.
Notice of Allowance mailed Apr. 27, 2011 in U.S. Appl. No. 11/997,563.
International Search Report for PCT/JP2007/001350, mailed Jul. 1, 2008.
Notice of Allowance mailed Jul. 11, 2011 in U.S. Appl. No. 12/443,015.
International Search Report for PCT/JP2007/074635, mailed Jan. 29, 2008.
English translation of the International Preliminary Report on Patentability mailed Feb. 14, 2008 in PCT Application No. PCT/JP2006/315142.
Kubo et al., "Development of High-Performance ASV-LCDs Using Continuous Pinwheel Alignment (CPA) Mode", pp. 1-5, Jun. 7, 2001.
EP Supplementary Search Report mailed Dec. 17, 2009 in EP application 07791179.0.
EP Supplementary Search Report mailed Dec. 29, 2009 in EP application 07806137.1.
U.S. Office Action mailed Feb. 17, 2011 in related U.S. Appl. No. 12/442,218.
U.S. Office Action mailed Jul. 29, 2011 in related U.S. Appl. No. 12/293,895.
Notice of Allowance mailed Mar. 7, 2011 in related U.S. Appl. No. 12/293,895.
International Preliminary Report on Patentability mailed Jul. 2, 2009 in PCT Application No. PCT/JP2007/073231.
English translation of the International Preliminary Report on Patentability mailed Oct. 30, 2008 in PCT Application No. PCT/JP2007/053037.
International Search Report for PCT/JP2007/053037, mailed Mar. 27, 2007.
Final Office Action mailed Jul. 20, 2011 in U.S. Appl. No. 12/440,791.
English translation of the International Preliminary Report on Patentability mailed Oct. 29, 2009 in corresponding PCT Application No. PCT/JP2007/074635.
International Preliminary Report on Patentability mailed Mar. 26, 2009 in corresponding PCT Application No. PCT/JP2007/064448.
International Preliminary Report on Patentability mailed Apr. 9, 2009 in PCT Application No. PCT/JP2007/066658.
International Search Report for PCT/JP2007/066658, mailed Dec. 4, 2007.
Jisaki et al, "Development of transflective LCD for high contrast and wide viewing angle by using homeotropic alignment", Asia Display/IDW '01, pp. 133-136.
KR Notice of Reasons for Rejection and English translation thereof mailed Apr. 25, 2006 in corresponding Korean application No. 10-2004-0110955.
Jignesh Gandhi et al., "Performance Enhancement of reflective CMOS Twistes Nematic Disp Projection Applications Using Compensating Films", pp. 1-6, reprinted from http://www/hanoah.com/publications/sid99paper Jignesh final pdf. (1999).
Thomson-CSFILR-Jan. 2000, "Optical compensation for displays".
U.S. Office Action mailed Nov. 14, 2008 in U.S. Appl. No. 12/081,752.
Final U.S. Office Action mailed Apr. 30, 2009 in U.S. Appl. No. 12/081,752.
International Search Report for PCT/JP207/064448 mailed Aug. 21, 2007.
English translation of the International Preliminary Report on Patentability mailed Jan. 7, 2010 in corresponding PCT Application No. PCT/ JP2008/001350.
U.S. Notice of Allowance mailed Aug. 29, 2011 in U.S. Appl. No. 12/519,447.
Sugita et al, "Brightness Enhancement in Transflective LCD by Concentration of Uniaxially Collimated Light with a Micro-Lenticular Lens", , IDW 2007, pp. 1515-1518.
U.S. Appl. No. 12/593,403, filed Sep. 28, 2009, entitled "Liquid Crystal Display Panel with Microlens Array and Method for Manufacturing the Same".

English translation of International Preliminary Report on Patentability mailed in corresponding PCT Application No. PCT/JP2007/070907.

International Search Report for PCT/JP2007/070907, mailed Nov. 20, 2007.

U.S. Appl. No. 12/442,218, Murao, filed Mar. 20, 2009.

U.S. Appl. No. 12/440,791, Usukura, filed Mar. 11, 2009.

U.S. Appl. No. 12/443,015, Kosegawa, filed Mar. 26, 2009.

K. Kalantar, "Viewing Angle Control using Optical Microstructures on Light-Guide Plate for Illumination System of Mobile Transmissive LCD Module", IDW'02, pp. 549-552.

A. Funamoto at al., "Prism-Sheetless High Bright Backlight System for Mobile Phone", IDW'04, pp. 687-690.

U.S. Office Action mailed Mar. 20, 2012 in U.S. Appl. No. 12/664,983.

* cited by examiner (a)

(b)

(c)

(d)

(e)

(a)

(b)

(c)

(d)

(a)

(b)

(c)

(d)

(e)

(f)

(g)

LIQUID CRYSTAL DISPLAY PANEL WITH MICRO-LENS ARRAY AND LIQUID CRYSTAL DISPLAY DEVICE

This application is the U.S. national phase of International Application No. PCT/JP2007/070907, filed 26 Oct. 2007, which designated the U.S. and claims priority to Japanese Patent Application No. 2007-003412, filed 11 Jan. 2007, the entire contents of each of which are hereby incorporated by reference.

TECHNICAL FIELD

The present invention relates to a liquid crystal display panel and a liquid crystal display device, and more particularly to a liquid crystal display panel and a liquid crystal display device which include a microlens array.

BACKGROUND ART

In recent years, liquid crystal display devices are widely used as display devices for monitors, projectors, mobile information terminals, mobile phones, and the like. Generally speaking, a liquid crystal display device allows the transmittance (or reflectance) of a liquid crystal display panel to vary with a driving signal, thus modulating the intensity of light from a light source for irradiating the liquid crystal display panel, whereby images and text characters are displayed. Liquid crystal display devices include direct-viewing type display devices in which images or the like that are displayed on the liquid crystal display panel are directly viewed, projection-type display devices (projectors) in which images or the like that are displayed on the display panel are projected onto a screen through a projection lens in an enlarged size, and so on.

By applying a driving voltage which corresponds to an image signal to each of the pixels that are in a regular matrix arrangement, a liquid crystal display device causes a change in the optical characteristics of a liquid crystal layer in each pixel, and regulates the transmitted light in accordance with the optical characteristics of the liquid crystal layer with polarizers (which typically are polarizing plates) being disposed at the front and rear thereof, thereby displaying images, text characters, and the like. In the case of a direct-viewing type liquid crystal display device, these polarizing plates are usually directly attached to a light-entering substrate (the rear substrate) and a light-outgoing substrate (the front substrate or viewer-side substrate) of the liquid crystal display panel.

Methods for applying an independent driving voltage for each pixel include a passive matrix type and an active matrix type. Among these, on a liquid crystal display panel of the active matrix type, switching elements and wiring lines for supplying driving voltages to the pixel electrodes need to be provided. As switching elements, non-linear 2-terminal devices such as MIM (metal-insulator-metal) devices and 3-terminal devices such as TFT (thin film transistor) devices are in use.

On the other hand, in a liquid crystal display device of the active matrix type, when strong light enters a switching element (in particular a TFT) which is provided on the display panel, its element resistance in an OFF state is decreased, thereby allowing the electric charge which was charged to the pixel capacitor under an applied voltage to be discharged, such that a predetermined displaying state cannot be obtained. Thus, there is a problem of light leakage even in a black state, thus resulting in a decreased contrast ratio.

Therefore, in a liquid crystal display panel of the active matrix type, in order to prevent light from entering the TFTs (in particular channel regions), a light shielding layer (called a black matrix) is provided on a TFT substrate on which the TFTs and the pixel electrodes are provided, or on a counter substrate that opposes the TFT substrate via the liquid crystal layer, for example.

Now, in the case where the liquid crystal display device is a reflection-type liquid crystal display device, decrease in the effective pixel area can be prevented by utilizing reflection electrodes as a light shielding layer. However, in a liquid crystal display device which performs displaying by utilizing transmitted light, providing a light shielding layer in addition to the TFTs, gate bus lines, and source bus lines, which do not transmit light, will allow the effective pixel area to be decreased, thus resulting in a decrease in the ratio of the effective pixel area to the total area of the displaying region, i.e., the aperture ratio.

Liquid crystal display devices are characterized by their light weight, thinness, and low power consumption, and therefore are widely used as display devices of mobile devices such as mobile phones and mobile information terminals. With a view to increasing the amount of displayed information, improving the image quality, and so on, there are stronger and stronger desires for display devices to have higher resolutions. Conventionally, it has been a standard to adopt QVGA displaying by 240×320 pixels for liquid crystal display devices of the 2 to 3-inch class, for example, but devices which perform VGA displaying by 480×640 pixels have also been produced in the recent years.

As liquid crystal display panels become higher in resolution and smaller in size, the aforementioned decrease in their aperture ratio presents a greater problem. The reason is that, even if there is a desire to reduce the pixel pitch, constraints such as electrical performance and fabrication techniques make it impossible for the TFTs, the bus lines, etc., to become smaller than certain sizes. It might be possible to enhance the brightness of the backlight in order to compensate for the decreased transmittance, but this will induce an increased power consumption, thus presenting a particular problem to mobile devices.

In recent years, as display devices of mobile devices, transflective-type liquid crystal display devices which perform displaying by utilizing light from a backlight under dark lighting and perform displaying by reflecting light entering the display surface of the liquid crystal display panel under bright lighting have become prevalent. In a transflective-type liquid crystal display device, a region (reflection region) which performs displaying in the reflection mode and a region (transmission region) which performs displaying in the transmission mode are included in each pixel. Therefore, reducing the pixel pitch significantly will lower the ratio of the area of transmission region to the total area of the displaying region (aperture ratio of the transmission region). Thus, although transflective-type liquid crystal display devices have the advantage of realizing displaying with a high contrast ratio irrespective of the ambient brightness, they have a problem in that their brightness is lowered as the aperture ratio of the transmission region becomes smaller.

As a method for improving the efficiency of light utility of such a liquid crystal display device including transmission regions, Patent Document 1 and Patent Document 2 disclose a method of providing microlenses for converging light in each pixel on the liquid crystal display panel in order to improve the effective aperture ratio of the liquid crystal display panel. Furthermore, the applicant discloses in Patent Document 3 a production method for a liquid crystal display panel with a microlens array, which is suitably used for transmission-type or transflective-type liquid crystal display devices and the like. According to the production method described in Patent Document 3, microlenses can be formed corresponding to the pixels in a self-aligning manner, with a high positional precision.

Generally speaking, a VA-type (vertical-alignment type) liquid crystal display device has high viewing angle characteristics as compared to those of a TN-type liquid crystal display device or the like, and using an optical film (polarizing plate+optical compensation element) on both sides of a VA-type liquid crystal display panel makes it possible to achieve displaying with a wide viewing angle and a high contrast. Herein, it is commonplace to employ the same optical film on the light-incident side and on the outgoing side, whereby a high optical compensation effect can be obtained.

As an example of a VA-type liquid crystal display device, Patent Document 4 describes a liquid crystal display device having a wide-viewing-angle polarizing plate on both sides of a liquid crystal layer, wide-viewing-angle polarizing plate being composed by attaching two different phase difference layers on a polarization film. Moreover, Patent Document 5 describes an example of a liquid crystal display device having microlenses. In there, in order to prevent a deterioration in contrast due to the provision of microlenses, a polarizer is disposed between the microlenses and a liquid crystal panel, rather than outside the microlenses.

[Patent Document 1] Japanese Laid-Open Patent Publication No. 2003-337207

[Patent Document 2] Japanese Laid-Open Patent Publication No. 2005-275142

[Patent Document 3] Japanese Laid-Open Patent Publication No. 2005-196139 (Japanese Patent No. 3708112)

[Patent Document 4] Japanese Laid-Open Patent Publication No. 2003-121642

[Patent Document 5] Japanese Laid-Open Patent Publication No. 5-188364

DISCLOSURE OF INVENTION

Problems to be Solved by the Invention

In a projection type display device such as a projector, there is a long distance from the device to the screen, and therefore high viewing angle characteristics are not required for the liquid crystal display panel. However, in a direct-viewing type liquid crystal display device used for mobile devices, digital still cameras, etc., high viewing angle characteristics are required. Therefore, in the case of a direct-viewing type liquid crystal display device which is not intended for use in a projection type display device, it might be conceivable to apply a VA-type liquid crystal display device. For an improved luminance, it might also be conceivable to adopt microlenses in such a VA-type liquid crystal display device. However, even if microlenses are to be adopted in a VA-type liquid crystal display device, no liquid crystal display panel construction has been realized that can achieve high levels of viewing angle characteristics and contrast performance.

If the liquid crystal panel construction which is described in Patent Document 4 were adopted in a liquid crystal panel with microlenses in order to increase the luminance of a VA-type liquid crystal display device, light which has been linearly-polarized through the polarizers would pass through the microlenses having spherical surfaces, so that leakage of light might occur during black displaying, thus resulting in a lower contrast.

If a polarizer is disposed between a microlens array and a liquid crystal panel in order to prevent lowering of contrast as described in Patent Document 5, the following problems will occur.

(1) Since a separately-produced microlens array needs to be attached onto an optical film, the microlens array may possibly be scratched during the production steps.

(2) Since a microlens array is positioned outside the liquid crystal display panel, particularly when used for a direct-viewing type liquid crystal display panel, there is a concern that the microlens array may be scratched, or soil may attach to it.

(3) As compared to glass, an optical film has a low degree of flatness and a large thermal expansion, and therefore there is a fear of deformation and misalignment of the microlens array to be disposed on the optical film.

(4) It is difficult to reduce the focal length of microlenses, and thus good optical characteristics cannot be obtained.

In a direct-viewing type liquid crystal display device which is used in a mobile device, a digital still camera, or the like, a high viewing angle needs to be maintained by using light which has traveled through microlenses, unlike in a liquid crystal display panel that is used for a projection type display device such as a projector. For this purpose, it is necessary to reduce the interval between the liquid crystal panel and the microlenses as much as possible, and deflect the light entering the lenses, which is generally parallel, by about 60° at the most. However, such a drastic change In the optical path due to the lenses would also have a large influence on the effect of the optical compensation elements.

Therefore, for any direct-viewing type liquid crystal display device, it has not been easy to determine an appropriate device construction that provides a high luminance and yet realizes excellent viewing angle characteristics and contrast performance.

The present invention has been made in view of the above problems, and an objective thereof is to provide a direct-viewing type liquid crystal display panel with a microlens array which has good viewing angle characteristics and a high contrast and is capable of high-luminance displaying, as well as a liquid crystal display device incorporating the same.

Means for Solving the Problems

A liquid crystal display panel with a microlens array according to the present invention comprises: a liquid crystal panel having a plurality of pixels; a microlens array provided on a light-incident side of the liquid crystal panel; a first polarizing plate and a first optical compensation element provided on a light-outgoing side of the liquid crystal panel; and a second polarizing plate and a second optical compensation element provided on a light-incident side of the microlens array, wherein, a retardation of the first optical compensation element along a thickness direction is greater than a retardation of the second optical compensation element along a thickness direction.

In one embodiment, the first optical compensation element comprises a first phase difference plate and a second phase difference plate disposed between the liquid crystal panel and the first polarizing plate; and the second optical compensation element comprises one phase difference plate disposed between the liquid crystal panel and the second polarizing plate.

In one embodiment, the liquid crystal display panel with a microlens array is a liquid crystal display panel for a direct-viewing type liquid crystal display device.

In one embodiment, the liquid crystal panel includes a vertical-alignment type liquid crystal layer, and the liquid crystal display panel with a microlens array is a vertical-alignment type liquid crystal display panel.

In one embodiment, in the first optical compensation element, the first phase difference plate has a retardation along an in-plane direction and substantially zero retardation along the thickness direction, and the second phase difference plate has a retardation along the thickness direction and substantially zero retardation along an in-plane direction; and the one phase difference plate of the second optical compensation element has a retardation along an in-plane direction and substantially zero retardation along the thickness direction.

In one embodiment, in the first optical compensation element, the first phase difference plate is a positive monoaxial phase difference plate having a slow axis in the plane of the phase difference plate, and the second phase difference plate is a negative monoaxial phase difference plate having a slow axis along the thickness direction; and the one phase difference plate of the second optical compensation element is a positive monoaxial phase difference plate having a slow axis in the plane of the phase difference plate.

In one embodiment, the retardation of the second phase difference plate along the thickness direction is no less than 200 nm and no more than 300 nm.

In one embodiment, the retardation of the second phase difference plate along the thickness direction is about 250 nm.

A liquid crystal display device according to the present invention is a liquid crystal display device comprising the aforementioned liquid crystal display panel with a microlens array.

Effects of the Invention

According to the present invention, there can be provided a direct-viewing type liquid crystal display panel with a microlens array which has good viewing angle characteristics and a high contrast and is capable of high-luminance displaying, as well as a liquid crystal display device incorporating the same.

Figure 1:
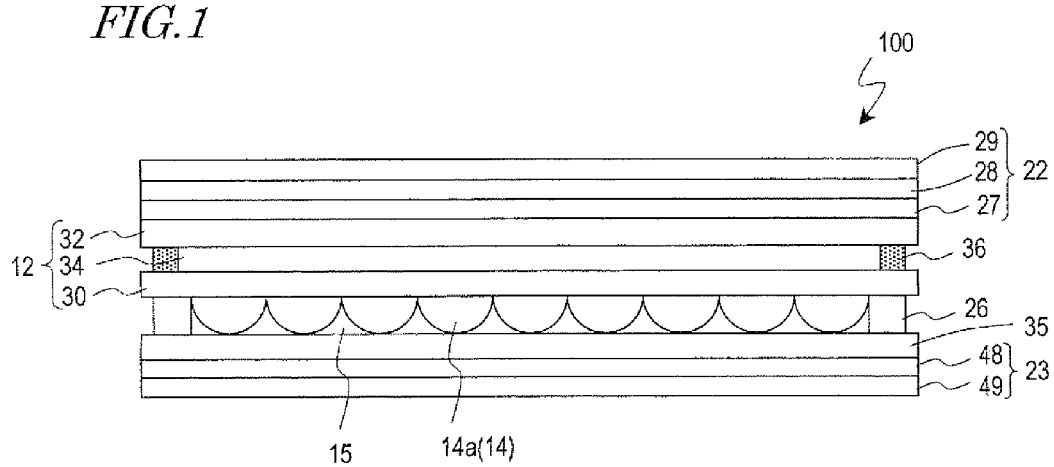
[FIG. 1] A cross-sectional view schematically showing the construction of a liquid crystal display panel with a microlens array according to the present invention.

DESCRIPTION OF REFERENCE NUMERALS 12 liquid crystal panel
14 microlens array
14*a* microlens
14*a*' latent image of microlens
15 gap
17 pixel aperture
22 front-face side optical film
23 rear-face side optical film
24 adhesion layer
26 support
26' latent image of support
27 viewing angle compensation plate
28 phase difference plate
29 polarizing plate
30 electrical element substrate
32 counter substrate
34 liquid crystal layer
35 protection layer
36 sealant
37 adhesion layer
39 resin layer
40 photomask
41 backlight
42 light source
43 light guide plate
44 reflector
47 viewing angle compensation plate
48 phase difference plate
49 polarizing plate
100 liquid crystal display panel with a microlens array
200 liquid crystal display device

BEST MODE FOR CARRYING OUT THE INVENTION

Hereinafter, with reference to the drawings, an embodiment of a liquid crystal display panel with a microlens array according to the present invention will be described.

FIG. 1 is a cross-sectional view schematically showing the construction of a liquid crystal display panel 100 with a microlens array of the present embodiment. As shown in the figure, the liquid crystal display panel 100 with a microlens array of the present embodiment (hereinafter may be simply referred to as the liquid crystal display panel 100) includes a liquid crystal panel (also referred to as a "liquid crystal cell" or "quid crystal display panel") 12 having a plurality of pixels in a matrix arrangement, and a microlens array 14 which is provided on the light-incident side (the lower side in the figure) of the liquid crystal panel 12 and which includes a plurality of microlenses 14*a*.

Although the microlens array 14 is made of a an acryl-type UV-curable resin which has a high transmittance for visible light, it may also be made of an epoxy-type UV-curable resin, a thermosetting resin, or the like. Although a lenticular-type lens covering a plurality of pixels is employed for each microlens 14*a* of the microlens array 14, 各the microlens 14*a* may be composed of a hemispherical microlens corresponding to each pixel.

The liquid crystal panel 12 includes an electrical element substrate 30 on which switching elements (e.g. TFTs or MIM devices) are provided for the respective pixels, a counter substrate 32 which is e.g. a color filter substrate (CF substrate), and a vertical-alignment type liquid crystal layer 34. The liquid crystal layer 34 includes a liquid crystal material which is filled between the electrical element substrate 30 and the counter substrate 32, and is sealed by a sealant 36 that is provided in the outer periphery.

To the viewer's side of the liquid crystal panel 12 (upper side of the figure), a front-face side optical film 22 is attached via an adhesion layer which is not shown. The front-face side optical film 22 includes a viewing angle compensation plate 27 provided on the counter substrate 32, a phase difference plate 28 provided on the viewing angle compensation plate 27, and a polarizing plate 29 provided on the phase difference plate 28. In the present specification, the phase difference plate 28 may also be referred to as a first phase difference plate, and the viewing angle compensation plate 27 as a second phase difference plate. The phase difference plate 28 and the viewing angle compensation plate 27 are together referred to as a first optical compensation element.

On the light-incident side of the microlens array 14, a protection layer 35 is disposed via supports 26 which are formed in the peripheral region of the microlens array 14, and a rear-face side optical film 23 is attached to the light-incident side of the protection layer 35 via an adhesion layer which is not shown. The rear-face side optical film 23 includes a phase difference plate 48 provided on the protection layer 35, and a polarizing plate 49 provided on the phase difference plate 48. The phase difference plate 48 may also be referred to as a second optical compensation element. The polarizing plate 29 and the polarizing plate 49 are placed in crossed Nicols so that their transmission axes intersect at 90°.

The protection layer 35 and the microlens array 14 are formed in such a manner that the protection layer 35 is in contact with only the neighborhood of the apex of each microlens 14a, so that gaps 15 containing air are formed between the microlens array 14 and the protection layer 35. A construction may also be possible where the protection layer 35 is supported only by the supports 26, such that the microlenses 14a are not in contact with the protection layer 35. A construction may also be possible where a protrusion is provided on the tip of each microlens 14a, such that the protrusion is in contact with the protection layer 35.

Similarly to the microlens array 14, the protection layer 35 is made of an acryl-type UV-curable resin having a high transmittance for visible light. An epoxy-type UV-curable resin or thermosetting resin may also be adopted for the protection layer 35. Preferably, the protection layer 35 is made of the same material as that of the microlenses 14a, or a material having a refractive index which is substantially equal to the refractive index of the material composing the microlenses 14a. Moreover, it is preferable that the supports 26 are made of the same material as that of the microlenses 14a, whereby the production steps can be simplified.

For the polarizing plates 29 and 49, iodine-type polarizing plates are used in which PVA (polyvinyl alcohol) having been dyed with iodine and stretched is sandwiched by TAC (triacetyl cellulose). As the polarizing plates 29 and 49, dyestuff-type polarizing plates, polarizing plates in which a norbornene type resin or the like is used instead of TAC, or the like may also be used.

For the phase difference plates 28 and 48, a norbornene type resin is used. A polycarbonate-type resin or the like may also be used for the phase difference plates 28 and 48. Although a film which is coated with cholesteric liquid crystal is used for the viewing angle compensation plate 27, a film of norbornene type resin or the like may also be used. The functions of the phase difference plate 28 and the viewing angle compensation plate 27 may also be served by a single film of norbornene type resin which has been subjected to biaxial stretching.

For each of the phase difference plate 28, the viewing angle compensation plate 27, and the phase difference plate 48, a retardation (Re) along the in-plane direction is expressed as $(n_x-n_y)\times d$, and a retardation (Rth) along the thickness direction is expressed as $\{(n_x+n_y)/2-n_z\}\times d$, where: d is the thickness of each element; $n_z$ is the refractive index along the thickness direction at a wavelength of 550 nm; and $n_x$ (slow axis direction) and $n_y$ (fast axis direction) are refractive indices along the in-plane direction.

Each of the phase difference plate 28 and the phase difference plate 48 is a positive monoaxial phase difference plate having a slow axis in the plane of the plate, and is a λ/4 plate having an in-plane direction retardation (Re) of 140 nm. Their retardation (Rth) along the thickness direction is substantially zero. The viewing angle compensation plate 27 is a negative monoaxial phase difference plate having a slow axis along the thickness direction, and has a retardation (Rth) of 250 nm along the thickness direction and an in-plane direction retardation (Re) of substantially zero. Note that the retardation (Rth) of the viewing angle compensation plate 27 along the thickness direction is preferably no less than 200 nm and no more than 300 nm.

The phase difference plate 28 and the phase difference plate 48 are disposed so that their in-plane slow axes intersect at 90°. The slow axis of the phase difference plate 28 and the transmission axis of the polarizing plate 29, as well as the slow axis of the phase difference plate 48 and the transmission axis of the polarizing plate 49, extend in directions which are 45° apart.

In the liquid crystal display panel of the present embodiment, when a viewing angle region in which a contrast (or contrast ratio) CR on the display surface is greater than 10 (region whose CR>10) was 60° or more, when observed both along a direction which is parallel to the direction of convergence (longitudinal direction of the lenticular lenses) and along a direction perpendicular thereto. Moreover, the CR when observed in a direction perpendicular to the display surface (frontal CR) was 400.

Note that, when any reference to the retardation value of an optical compensation element is made in the present specification, it is assumed that any retardation value ascribable to TAC is not included in the retardation value of the optical compensation element, even if the TAC of the polarizing plates 29 and 49 has some retardation.

In the liquid crystal display panel of the present embodiment, it is possible to obtain such high contrast in a wide viewing angle range. However, in order to realize such high performance, the inventors of the present invention have conducted various studies concerning the construction of the liquid crystal display panel. Hereinafter, an example of such studies will be described by using Reference Example of a liquid crystal display panel.

Figure 2:
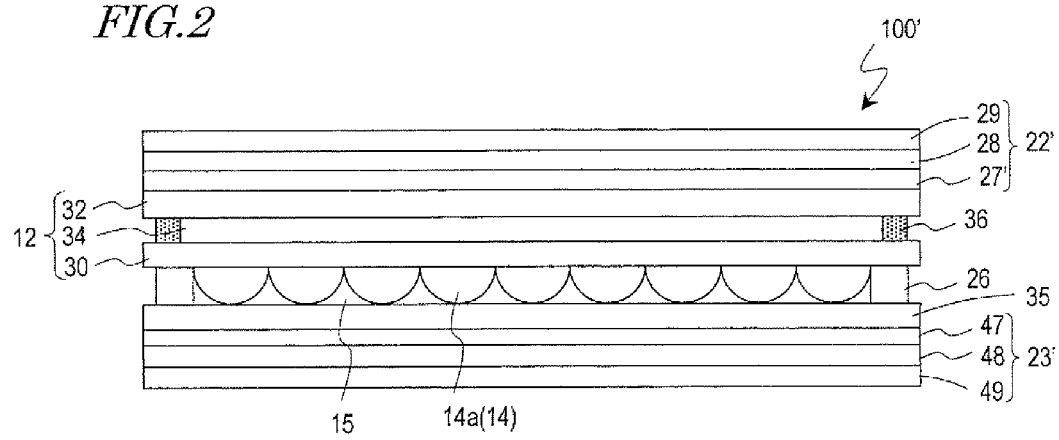
[FIG. 2] A cross-sectional view schematically showing the construction of a variant of a liquid crystal display panel with a microlens array according to Reference Example.

FIG. 2 is a cross-sectional view schematically showing the construction of a liquid crystal display panel with a microlens array 100' according to Reference Example. The positioning of the optical film in the liquid crystal display panel 100' is a straightforward application of the positioning method shown in Patent Document 4 to a liquid crystal display panel with microlenses. Among the constituent elements of the liquid crystal display panel 100', any element that is identical to a constituent element of the above-described liquid crystal display panel 100 is denoted by the same reference numeral, and the description thereof is omitted.

As shown in the figure, the liquid crystal display panel 100' includes the same liquid crystal panel 12 and microlens array 14 as those in the above-described embodiment. A front-face side optical film 22' is attached to the viewer's side of the liquid crystal panel 12. The front-face side optical film 22' includes a viewing angle compensation plate 27', a phase difference plate 28, and a polarizing plate 29. A rear-face side optical film 23' is attached to the light-incident side of the protection layer 35. The rear-face side optical film 23' includes a viewing angle compensation plate 47, a phase difference plate 48, and a polarizing plate 49.

As the polarizing plates 29 and 49 and the phase difference plates 28 and 48, the same ones as those in the above-described embodiment are used. The viewing angle compensation plates 27' and 47 are viewing angle compensation plates coated with cholesteric liquid crystal, and are negative monoaxial phase difference plates having a slow axis along the thickness direction. Both have a retardation (Rth) along the thickness direction of 130 nm and an in-plane direction retardation (Re) of substantially zero.

In the liquid crystal display panel 100' of Reference Example, the viewing angle range exhibiting CR>10 along a direction perpendicular to the direction of convergence of the lenses was 60° or more, but the viewing angle range exhibiting CR>10 was about 40° along a direction which is parallel to the direction of convergence. The frontal CR was 290.

Upon studying improvements in the contrast and viewing angle characteristics by using the liquid crystal display panel of Reference Example, it has been confirmed that the viewing angle characteristics are improved by increasing the viewing angle-compensation by the optical element on the outgoing side. For example, by setting the retardation of the viewing angle compensation plate 27' along the thickness direction to be Rth=250 nm and the retardation of the viewing angle compensation plate 47 along the thickness direction to be Rth=120 nm, the viewing angle range exhibiting CR>10 along a direction parallel to the direction of convergence becomes 60° or more, and the frontal CR is improved to 330. However, with this construction, the viewing angle range of CR>10 along a direction perpendicular to the direction of convergence is as narrow as about 50°, thus indicating a problem in practice.

Accordingly, further improvements have been pursued to indicate that, by setting the retardation of the viewing angle compensation plate 27' at the outgoing side along the thickness direction to be Rth=250 nm and by removing the viewing angle compensation plate 47 from the light-incident side, high characteristics are obtained such that a viewing angle range exhibiting CR>10 is 60° or more both along a direction parallel to the direction of convergence and a direction perpendicular to the direction of convergence, with a frontal CR of 400. Therefore, this optical element construction has been adopted in the liquid crystal display panel 100 of the embodiment of the present invention.

The present invention is suitably applied to a liquid crystal display panel having a pixel pitch of 50 μm to 250 μm, and in particular to a liquid crystal display panel with a pixel pitch of 200 μm or less. The diameter of each microlens (a width along a direction in which its lens function is exhibited) is set substantially equal to the pixel pitch. The height of each microlens is about 10 μm to 35 μm, and is to be determined by the microlens diameter and the pixel pitch.

Next, with reference to FIGS. 3($a$) to ($e$) and FIGS. 4($a$) to ($d$), a preferable production method for a liquid crystal display panel with a microlens array according to the present invention will be described. Herein, FIGS. 3($a$) to ($e$) and FIGS. 4($a$) to ($c$) show steps by which a plurality of liquid crystal display panels 100 shown FIG. 1 are formed simultaneously on a single mother substrate, whereas FIG. 4($d$) shows steps by which the plurality of liquid crystal display panels 100 formed on the mother substrate are cut off to become a plurality of liquid crystal display panels 100 which are independent from one another. Therefore, in FIGS. 3($a$) to ($e$) and FIGS. 4($a$) to ($c$), the constituent elements of the plurality of liquid crystal display panels 100, e.g., the electrical element substrates 30, the counter substrates 32, the protection films 35, the optical films 22 and 23, and the like, are each shown as one continuous layer.

Figure 3:
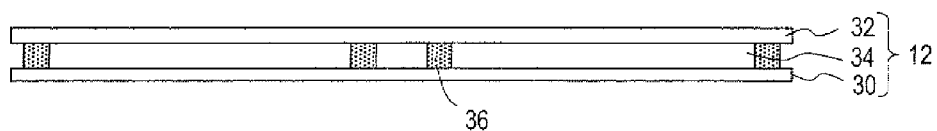
[FIG. 3] (*a*) to (*e*) are cross-sectional views schematically showing a former portion of a production method according to the present embodiment.
Figure 3:
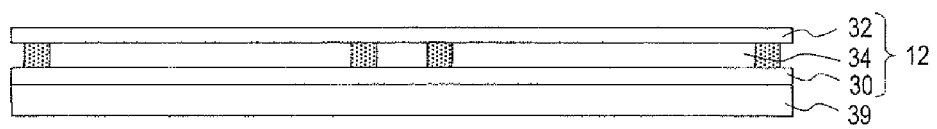
Figure 3:
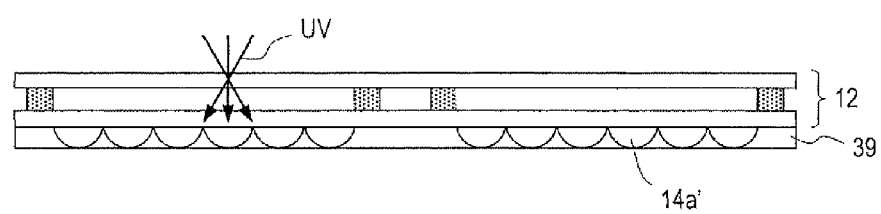
Figure 3:
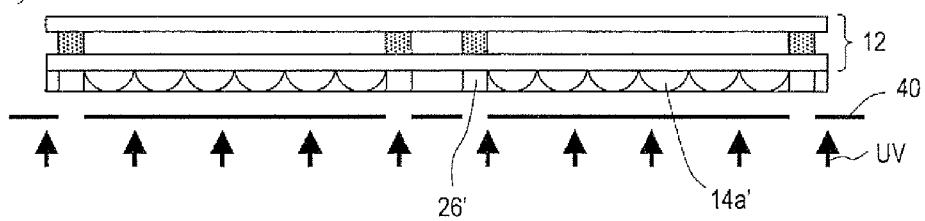
Figure 3:
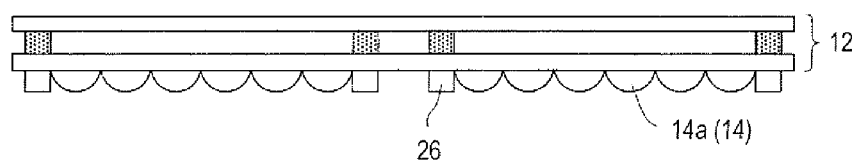
Figure 4:
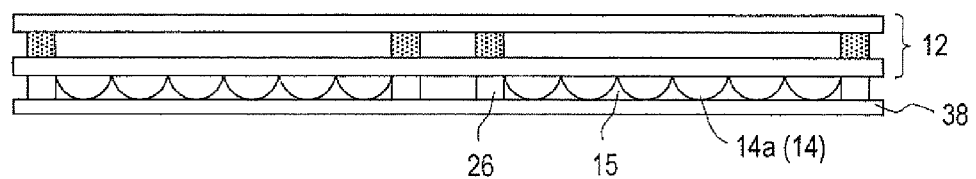
[FIG. 4] (*a*) to (*d*) are cross-sectional views schematically showing a latter portion of a production method according to the present embodiment.
Figure 4:
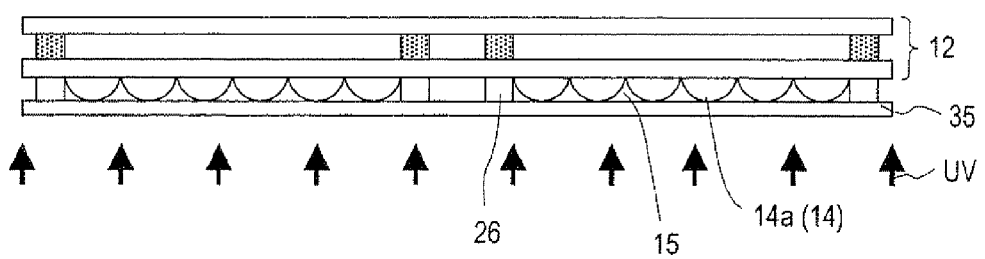
Figure 4:
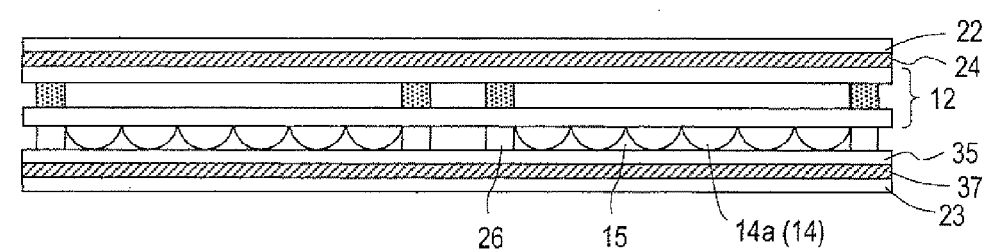
Figure 4:
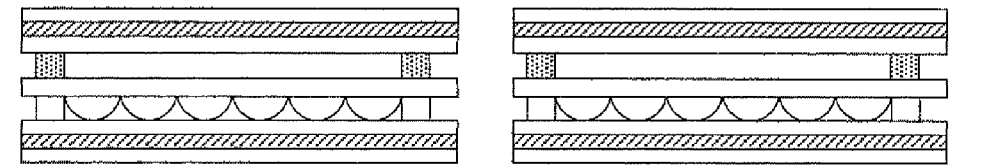

First, as shown in FIG. 3($a$), a liquid crystal panel 12 having a plurality of pixels in a matrix arrangement is provided. The liquid crystal panel 12 includes an electrical element substrate 30 such as a TFT substrate, a counter substrate 32 such as a color filter substrate, and a liquid crystal layer 34 containing a liquid crystal material. The liquid crystal layer 34 is formed by using a liquid crystal dropping method, and is sealed between the electrical element substrate 30 and the counter substrate 32 with a sealant 36.

Although a liquid crystal injection method could be adopted for the formation of the liquid crystal layer 34, use of the liquid crystal dropping method will make it easy to simultaneously form a plurality of liquid crystal panels on a mother substrate within a short period of time. In the case where the liquid crystal injection method is adopted, a liquid crystal is to be injected after the liquid crystal panel is formed. At this time, a problem of liquid crystal contamination may occur because of the microlens material or the like coming in contact with the liquid crystal. Use of the liquid crystal dropping method will also prevent such a contamination problem.

Next, as shown in FIG. 3($b$), a dry film (dry film resist) is attached on one of a pair of principal faces that is on the outside of the liquid crystal panel 12, thereby forming a resin layer 39. A photocurable resin is used as the material of the resin layer 39. Although it is preferable to use a UV-curable resin having a high transmittance for the dry film (resin layer 39), a photocurable resin, a thermosetting resin, or a photocurable-thermosetting type resin can otherwise be used. In a subsequent step, microlenses 14$a$ are formed by processing the resin layer 39. In order to realize a thin liquid crystal display device, it is desirable to make the thickness of the resin layer 39 as thin as possible, so long as a convergence effect is obtained with the microlenses.

Next, as shown in FIGS. 3($c$) to ($e$), a microlens array 14 having the plurality of microlenses 14$a$ and supports 26 are formed by processing the resin layer 39. Preferably, formation of the microlenses 14$a$ is performed by a method in self-aligning fashion (self alignment method) as described in Patent Document 3. According to this method, microlenses 14$a$ corresponding to the pixels can be easily formed with no misalignment of optical axes, whereby a high convergence effect can be obtained.

Based on this method, in the step shown in FIG. 3($c$), the resin layer 39 of UV curable resin is irradiated with UV light through the liquid crystal panel 12. During the UV light irradiation, the substrate or the UV light source is moved so as to change the incident angle of the irradiation light to the liquid crystal panel 12 in a stepwise or gradual manner. As a result, the irradiation intensity of the irradiation light on the resin layer 39 is locally changed, whereby microlenses 14$a$ corresponding to the respective pixels (latent images 14$a$' of microlenses) are formed.

Thereafter, as shown in FIG. 3($d$), the resin layer 39 is exposed to light from the opposite side of the liquid crystal panel 12 through a photomask 40, thereby forming supports 26 (latent images 26' of supports) in a peripheral region of the microlens array 14.

By performing a development step after this exposure step, as shown in FIG. 3($e$), the microlens array 14 having the plurality of microlenses 14$a$ is formed, and also the supports 26 are formed in the peripheral region of the microlens array 14. Since the height of the supports 26 and the microlenses 14$a$ can be defined by the thickness of the resin layer 39, a resin layer 39 having a high thickness uniformity can be obtained by using a dry film for the resin layer 39, thereby providing an advantage in that the height of the supports 26 and the microlenses 14a (maximum height) can be precisely controlled to the same height.

Thereafter, as shown in FIG. 4(a), the same dry film as the dry film used for forming the resin layer 39 is attached so as to be in contact with apex portions of the microlenses 14a and the supports 26, thus forming a resin layer 38. At this time, if the attachment pressure is too high, the dry film may enter into the recesses of the microlenses 14a; conversely, if it is too low, the degree of contact will decrease. Therefore, it is desirable that the attachment pressure is within a range from 0.05 to 1 MPa.

It is desirable that the temperature at which the dry film is attached is no less than 50 degrees and no more than the glass transition temperature of the dry film (which is 110 degrees in the present embodiment). If it is 50 degrees or less, the degree of contact between the dry film and the microlenses 14a and supports 26 will decrease, and thus peeling becomes likely to occur; and if it is greater than the glass transition temperature, the dry film will be so soft that the dry film may be buried in the microlens array. Moreover, it is preferable that the speed at which the dry film is press-fitted to the microlens array 14 is within the range from 0.5 to 4 m/min. If the speed is too fast, the degree of contact will be low, and if it is too slow, the production efficiency will be deteriorated.

Next, as shown in FIG. 4(b), the resin layer 38 is subjected to UV irradiation to perform a bake, whereby a protection layer 35 is formed. Since the protection layer 35 is secured to the apex portions of the microlenses 14a and the supports 26, peeling of the protection layer 35 and the rear-face side optical film 23 to be formed in a substrate step and display unevenness due to deformation of the protection layer 35 are prevented.

Thereafter, as shown in FIG. 4(c), the rear-face side optical film 23 including the viewing angle compensation plate 27, the phase difference plate 28, and the polarizing plate 29 mentioned above is attached to the liquid crystal panel 12 via the adhesion layer 37 and the supports 26. Moreover, the front-face side optical film 22 including the phase difference plate 48 and the polarizing plate 49 mentioned above is attached to the liquid crystal panel 12 via the adhesion layer 24. Preferably, the rear-face side optical film 23 is attached immediately after forming the protection layer 35. This will prevent the protection layer 35 from being scratched, and make for an easy handling in the next step. Note that the front-face side optical film 22 can be attached to the liquid crystal panel 12 at any arbitrary point in the aforementioned steps.

Finally, as shown in FIG. 4(d), by using a method described in Japanese Laid-Open Patent Publication No. 2004-4636, for example, the multilayer substrate shown in FIG. 4(c) is cut, whereby a plurality of liquid crystal display panels 100 with microlens arrays are completed.

In the steps in FIGS. 3(c) to (e) above, the microlens array 14 and the like can be formed by a method such as a transfer technique, for example. In the case of using a transfer technique, a stamper is pressed against the resin layer 39 to transfer a template of the stamper, whereby the microlens array 14 and the supports 26 are formed. As a result, a liquid crystal display panel having a similar structure to that which is shown in FIG. 3(e) is obtained.

Next, the shape of the microlenses 14a to be formed in the aforementioned steps will be described.

Figure 5:
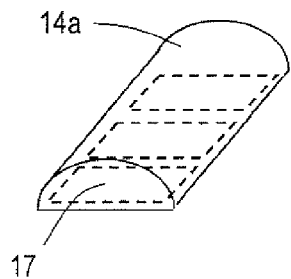
[FIG. 5] (*a*) to (*g*) are diagrams exemplifying microlens shapes that can be formed with a production method according to the present embodiment.
Figure 5:
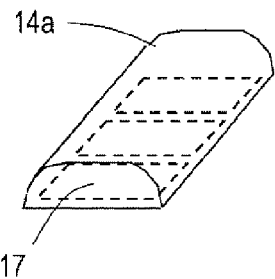
Figure 5:
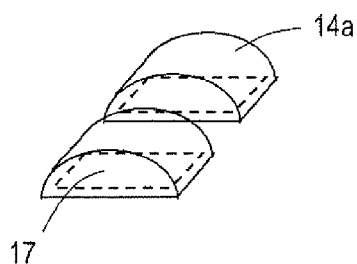
Figure 5:
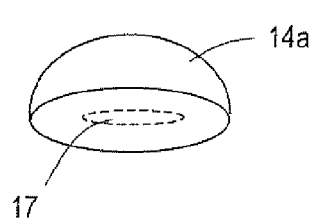
Figure 5:
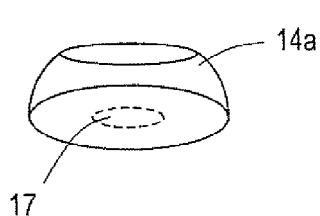
Figure 5:
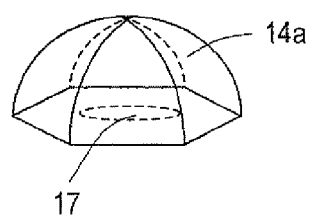
Figure 5:
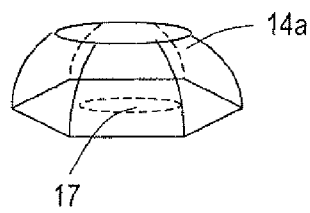

FIG. 5 is diagrams schematically exemplifying shapes of the microlenses 14a to be formed in the steps shown in FIGS. 3(b) to (d). In these steps, by adjusting the distribution of irradiation light amount for the resin layer 39, lenticular lenses each encompassing a plurality of pixel apertures (or pixels) 17 can be formed as shown in FIGS. 5(a) and (b), or microlens corresponding to the respective pixel apertures 17 can be formed as shown in FIGS. 5(c) to (g). The lens shown in FIG. 5(a) is a semicolumnar lenticular lens; and the lens shown in FIG. 5(b) is a lenticular lens having a flat portion in the neighborhood of its apex. The lenses shown in FIG. 5(c) are semicolumnar microlenses which are formed for the respective pixels; the lens shown in FIG. 5(d) is a hemispherical microlens which is formed for each pixel; and the lens shown in FIG. 5(e) is a hemispherical microlens whose apex portion is planarized. Moreover, the lens shown in FIG. 5(f) is a microlens having a hexagonal bottom face, which is formed for each pixel; and the lens shown in FIG. 5(g) is a microlens having a hexagonal bottom face, whose apex portion is planarized.

Figure 6:
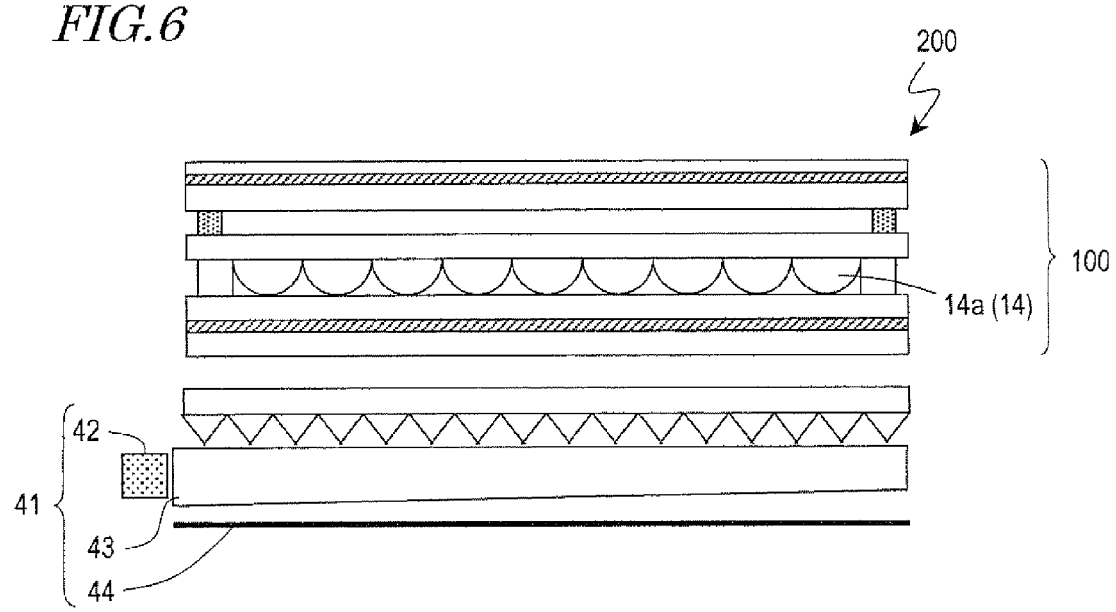
[FIG. 6] A cross-sectional view schematically showing a liquid crystal display device having a liquid crystal display panel with a microlens array according to the present invention.

FIG. 6 schematically shows the construction of a liquid crystal display device 200 having a liquid crystal display panel 100 according to an embodiment of the present invention.

The liquid crystal display device 200 includes the liquid crystal display panel 100 and a backlight 41 having high directivity. The backlight 41 includes a light source 42, a light guide plate 43 for receiving light emitted from the light source 42 and allowing it to propagate therethrough and be emitted toward the liquid crystal display panel 100, and a reflector 44 for causing the light which is emitted from the rear face of the light guide plate 43 or light which is incident from outside of the liquid crystal display device 200 and transmitted through the liquid crystal display panel 100 and the light guide plate 43 to be reflected toward the light guide plate 43.

The backlight 41 emits light that has a low directivity along the direction in which LEDs used as the light source 42 are arranged and a high directivity along a direction which is orthogonal thereto. Note that directivity is an index indicating a degree of divergence (or a degree of parallelism) of light from the backlight 41, and usually an angle which results in a brightness that is half of the brightness in the frontal direction is defined as a half-directivity angle. Therefore, as this half-directivity angle becomes smaller, the backlight has more of a peak (having a high directivity) in the frontal direction.

As the backlight 41 suitable for use in the liquid crystal display device 200, for example, backlights which are described in IDW'02 "Viewing Angle Control using Optical Microstructures on Light-Guide Plate for Illumination System of Mobile Transmissive LCD Module", K. KALANTAR, p549-552, IDW'04 "Prism-sheetless High Bright Backlight System for Mobile Phone" A. Funamoto et al. p.687-690, Japanese Laid-Open Patent Publication No. 2003-35824, Japanese National Phase PCT Laid-Open Publication No. 8-511129, and the like are applicable.

By providing the microlens array 14, light which illuminates areas other than the pixels (apertures), i.e., light which is emitted from the backlight 41 toward a light-shielding film BM that is formed around the pixels, is guided by the microlenses 14a to the pixels and emitted from the liquid crystal display panel 100. As a result, the efficiency of light utility of the backlight 41 is improved.

In order to obtain a high efficiency of light utility in a liquid crystal display panel having microlenses, such as the liquid crystal display panel 100, it is preferable that the backlight 41 has a high directivity. In other words, it is preferable that the half-directivity angle of light emitted from the backlight 41 is small.

On the other hand, as for the pixels, a higher efficiency of light utility can be obtained as their apertures become larger. However, in a transflective-type liquid crystal display panel, its characteristics as a reflection type are also important, and only a portion of each pixel (transmission region) is used for transmission displaying; therefore, there is a limitation to the aperture ratio (area ratio of the transmission region). In many cases, the aperture ratio in a transflective-type liquid crystal display panel is 20 to 60%. Thus, the present invention is suitably used for a liquid crystal display panel having a low aperture ratio, such as a transflective-type liquid crystal display panel.

According to the present invention, the luminance of a liquid crystal display panel is improved with microlenses, and the contrast thereof can be enhanced across a wide viewing angle range. Moreover, according to the present invention, such a liquid crystal display panel and a liquid crystal display device can be easily fabricated.

INDUSTRIAL APPLICABILITY

The present invention improves the displaying quality of a liquid crystal display panel and a liquid crystal display device, and particularly improves the quality of a direct-viewing type liquid crystal display panel and a liquid crystal display device which have a relatively small aperture ratio, such as a transflective-type liquid crystal display panel.

The invention claimed is:

1. A liquid crystal display device comprising:
a liquid crystal panel having a plurality of pixels;
a microlens array provided on a light-incident side of the liquid crystal panel;
a first polarizing plate and a first optical compensation element provided on a light-outgoing side of the liquid crystal panel;
a second polarizing plate and a second optical compensation element provided on a light-incident side of the microlens array,
a backlight provided on a light-incident side of the second polarizing plate, the backlight having higher directivity along a first direction than along a second direction which is orthogonal to the first direction, and wherein,
the first optical compensation element comprises a positive substantially monoaxial phase difference film having substantial retardation in an in-plane direction but substantially no retardation in a thickness direction, and a negative substantially monoaxial viewing angle compensation film having a retardation of from 200-300 nm in the thickness direction and substantially no retardation in an in-plane direction;
the second optical compensation element comprises a positive substantially monoaxial phase difference film having substantial retardation in an in-plane direction but substantially no retardation in a thickness direction, but no viewing angle compensation film having a retardation of from 200-300 nm in the thickness direction and substantially no retardation in an in-plane direction is provided on the light-incident side of the microlens array, so that a retardation of the first optical compensation element along the thickness direction is greater than a retardation of the second optical compensation element along the thickness direction.

2. The liquid crystal display device of claim 1, wherein, the first optical compensation element is disposed between the liquid crystal panel and the first polarizing plate; and the second optical compensation element is disposed between the liquid crystal panel and the second polarizing plate.

3. The liquid crystal display device of claim 2, wherein,
in the first optical compensation element, the positive substantially monoaxial phase difference film has having an in-plane slow axis, and the negative substantially monoaxial viewing angle compensation film has a slow axis along the thickness direction; and
the positive substantially monoaxial phase difference film of the second optical compensation element has an in-plane slow axis.

4. The liquid crystal display device of claim 1, wherein the liquid crystal display panel is a liquid crystal display panel for a direct-viewing type liquid crystal display device.

5. The liquid crystal display device of claim 1, wherein the liquid crystal panel includes a vertical-alignment type liquid crystal layer, and the liquid crystal display panel is a vertical-alignment type liquid crystal display panel.

6. The liquid crystal display device of claim 1, wherein the retardation of the negative substantially monoaxial viewing angle compensation film of the first optical compensation element along the thickness direction is about 250 nm.

* * * * *